United States Patent Office 2,702,821
Patented Feb. 22, 1955

2,702,821

DI-PHENYL-THIOUREAS

Charles F. Huebner, Morristown, and Caesar R. Scholz, Summit, N. J., assignors to Ciba Pharmaceutical Products, Incorporated, Summit, N. J., a corporation of New Jersey No Drawing. Application January 28, 1952, Serial No. 268,672

1 Claim. (Cl. 260—552)

The present invention relates to di-phenyl-thioureas wherein one phenyl group is substituted in the para-position with a dialkylamino group and the other phenyl group is substituted in the para-position with an alkyl or an alkoxy radical.

Despite intensive research for a long time by scientists for chemotherapeutic agents effective against tuberculosis, the results achieved leave much to be desired. A primary object of the present invention is the embodiment of a group of new substances characterized by antituberculosis activity in high degree and by a concomitant low toxicity. The substances are adapted to be administered orally.

This object, and others which will appear hereinafter, is realized by the di-(p-substituted phenyl)-thioureas of the present invention, which thioureas correspond to the formula:

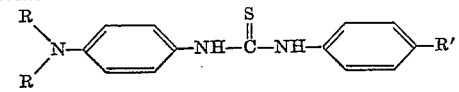

wherein R is a lower alkyl radical or both R's together with the nitrogen may complete a piperidine nucleus and R' is a lower aliphatic hydrocarbon radical containing 3 to 5 carbon atoms or a lower aliphatic hydrocarbon-oxygen radical containing 2 to 5 carbon atoms.

The new compounds, as precedingly defined, are obtained by reacting a para-amino-N,N-dialkyl aniline with the desired para-alkyl- or para-alkoxy-phenyl isothiocyanate in a neutral solvent such as ethanol, benzene, toluene, propanol and the like. Application of external heating is as a general rule unnecessary and the product crystallizes out of the reaction mixture on cooling. The process is illustrated by the reaction:

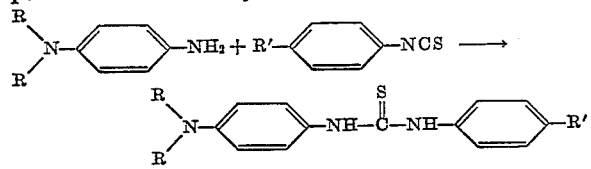

It is immaterial which of the reactants entering into the reaction carries the dialkylamino group, or the alkyl or the alkoxy group. Thus, a para-alkoxy aniline may be reacted with a para-dialkyl-amino-phenyl isothiocyanate according to the process:

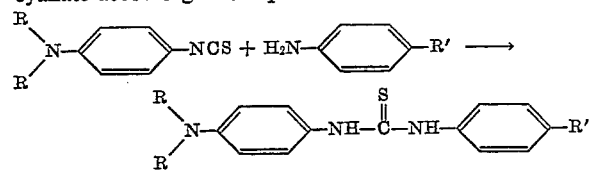

Alternatively, thiophosgene may be reacted with the alkyl- or alkoxy-substituted aniline and the reaction product then reacted with the dialkyl-amino aniline.

The substituted isothiocyanates are prepared by the method of Dyson [Journal of the Chemical Society, (London) 436 (1927)] by the action of thiophosgene on the desired substituted aniline. The older method of reacting substituted aniline in ammonia with carbon disulfide, preparing the lead salt of the resultant thiocarbamate and decomposing to the isothiocyanate may be used also.

The new compounds are useful as therapeutic agents and as intermediates for the preparation of therapeutically active substances. They comprise compounds with antituberculosis activity which, in comparison with known compounds with antituberculosis activity such as the thiosemicarbazones, are considerably less toxic and of enhanced activity.

The invention is described in greater detail in the examples which follow and which are presented solely by way of illustration and not by way of limitation. In the examples, parts by weight bear the same relation to parts by volume as do grams to milliliters. Temperatures are expressed in degrees centigrade. Melting points are uncorrected. Percentages are by weight.

Example 1

5.4 parts by weight of p-phenetyl isothiocyanate are dissolved in 50 parts by volume of benzene and 4.5 parts by weight of p-amino-dimethyl aniline are added over a 15-minute period while the mixture is refluxing. After an additional hour of refluxing, the mixture is cooled, filtered and the filtered product recrystallized from ethanol to yield 1 - (p - dimethylaminophenyl) - 3 - (p-phenetyl)-2-thiourea:

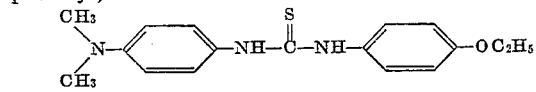

which melts at 175–176°.

Alternatively 100 parts by weight of p-dimethylaminophenyl isothiocyanate and 77 parts by volume of p-phenetidine are stirred with 1000 parts by volume of ethanol until solution of the isothiocyanate occurs. After ½ hour, the thiourea (identical with that of the preceding paragraph) separates and is recrystallized from ethanol; melting point 175–176°.

Example 2

To 10 parts by weight of p-propoxyphenyl isothiocyanate dissolved in 50 parts by volume of ethanol are added 5.8 parts by weight of p-aminodimethyl aniline. After standing for 1 hour, the product is filtered and recrystallized from ethanol to yield 1-(p-dimethylaminophenyl)-3-(p-propoxyphenyl)-2-thiourea:

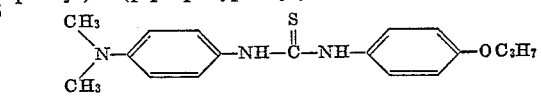

which melts at 148–149°.

By similarly reacting p-aminodimethyl aniline with equimolar quantities of the corresponding isothiocyanates indicated below according to the reaction scheme

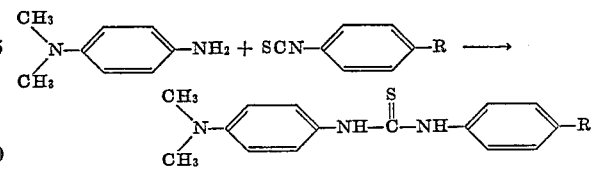

the substituted thioureas shown in the following Examples 2a to 2g are obtained.

Example 2a

R=—OC₄H₉

Thiourea product:

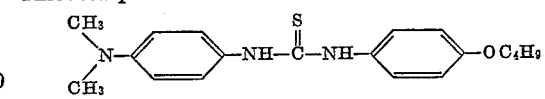

Melting point of product=119–121°.

Example 2b

R=—O—C₄H₉(iso)

Thiourea product:

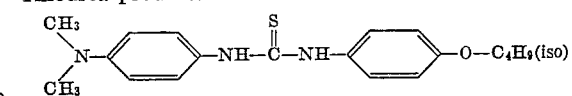

Melting point of product=146–147°.

Example 2c
R=—O—C₅H₁₁(iso)

Thiourea product:

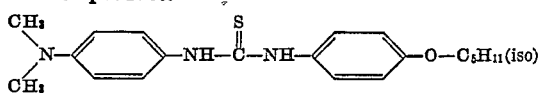

Melting point of product=133–134°.

Example 2d
R=—C₃H₇

Thiourea product:

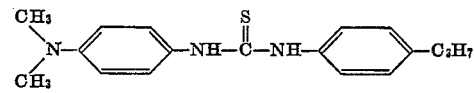

Melting point of product=156–158°.

Example 2e
R=—C₃H₇(iso)

Thiourea product:

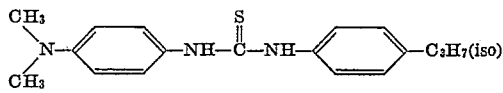

Melting point of product =171–172°.

Example 2f
R=—C₄H₉

Thiourea product:

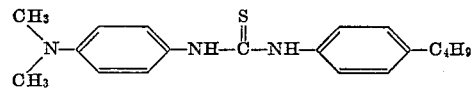

Melting point of product =130–132°.

Example 2g
R=—C₅H₁₁(iso)

Thiourea product:

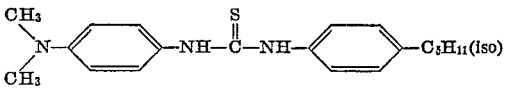

Melting point of product =141–142°.

Example 3

5 parts by weight of p-phenetyl isothiocyanate are dissolved in 50 parts by volume of ethanol. To this solution are added 8.2 parts by weight of p-aminodiethyl aniline. After standing for 1 hour, the crystalline product is filtered and recrystallized from ethanol to yield 1-(p-diethylaminophenyl)-3-(p-phenetyl)-2-thiourea:

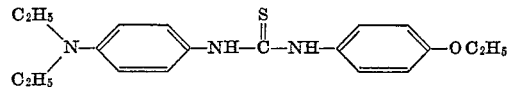

which melts at 151–152°.

By reacting p-aminodiethylaniline with equimolar quantities of the corresponding isothiocyanates indicated below according to the reaction:

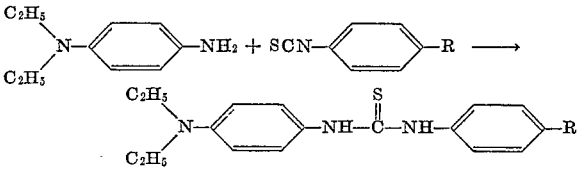

according to the method described above the substituted thioureas indicated in Examples 3a to 3c, are obtained.

Example 3a
R=—O—C₄H₉

Thiourea product:

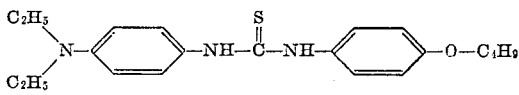

Melting point of product =141–142°.

Example 3b
R=—O—C₄H₉(iso)

Thiourea product:

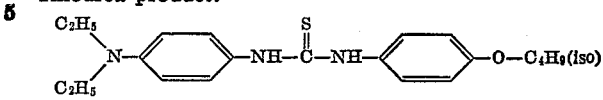

Melting point of product =116–117°.

Example 3c
R=—C₅H₁₁(iso)

Thiourea product:

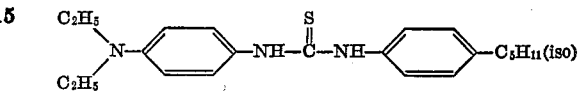

Melting point of product =103–105°.

Example 4

Equimolar quantities of p-aminodibutyl aniline and p-phenetyl isothiocyanate are reacted in ethanol according to the procedure described in Example 3, to yield 1-(p-dibutylaminophenyl)-3-(p-phenetyl)-2-thiourea:

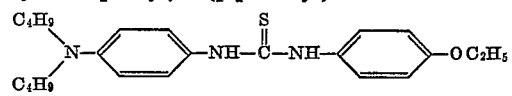

which melts at 88–91°.

Example 5

Equimolar quantities of 1-(p-aminophenyl)-piperidine and p-phenetyl isothiocyanate are reacted in aqueous methanol. The product which crystallizes out is recrystallized from ethanol to yield 1-(p-piperidylphenyl)-3-(p-phenetyl)-2-thiourea:

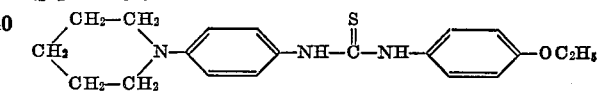

which melts at 148–149°.

Example 6

To 9.9 parts by volume of thiophosgene suspended in 90 parts by volume of water are added dropwise with stirring 6.45 parts by volume of p-phenetidine. External cooling is applied to keep the temperature at 15–20° C. After stirring for ½ hour after addition is complete, 10.6 parts by weight of anhydrous sodium carbonate and 13.1 parts by volume of p-aminodimethyl aniline are added and vigorous stirring continued for ½ hour. The crystalline thiourea is filtered and recrystallized from alcohol to yield 1-(p-dimethylaminophenyl)-3-(p-phenetyl)-2-thiourea:

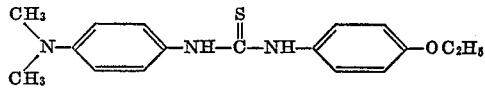

which melts at 175–176°.

Several of the para-substituted phenyl isothiocyanates referred to herein have never been recorded in the literature. They are prepared according to the method of Dyson, Journal of the Chemical Society (1927) 436 as follows:

To 1.3 molar equivalents of thiophosgene suspended in 10 times its volume of water is added dropwise with vigorous stirring 1 molar equivalent of the desired p-substituted aniline dissolved in 5 times its volume of chloroform. External cooling is applied to maintain the temperature of 15–20°. After the addition is complete, stirring is continued for ½ hour. The chloroform layer is removed and the chloroform distilled off. The residue is distilled under reduced pressure to yield the isothiocyanate.

According to this method the following new compounds are prepared:

p-propoxy-phenyl isothiocyanate, B. P.$_{15mm}$.163–168°
p-butoxy-phenyl isothiocyanate, B. P.$_{15mm}$.179–181°
p-isobutoxy-phenyl isothiocyanate, B. P.$_{15mm}$.172–176°
p-isoamoxy-phenyl isothiocyanate, B. P.$_{15mm}$.188–190° p-propyl-phenyl isothiocyanate, B. P.$_{20mm}$.144–154°
p-isopropyl-phenyl isothiocyanate, B. P.$_{15mm}$.140–150°
p-butyl-phenyl isothiocyanate, B. P.$_{14mm}$.150–154°
p-isoamyl-phenyl isothiocyanate, B. P.$_{15mm}$.189–190°

The new compounds have been found to be useful, for example, in the treatment of mice infected with a human strain of tubercle bacillus, such for example as Mycobacterium tuberculosis, strain H 37 RV. In the treatment of thus-infected mice, where the degree of infection is such that 50% of the animals are dead by the twentieth day after infection, the mice are fed the new compound according to this invention incorporated in the diet for 30 days followed by the diet without the said compound. A compound is considered to show good antitubercular activity if 50% or more of the animals are alive on the 35th day after infection. Those compounds showing good activity may be utilized according to the same method except that they are fed only for 21 days after infection at dose levels ranging from 0.1% down to 0.005% concentration in the diet. Some of the compounds of the invention may be fed at concentrations of 3% without causing noticeable ill effects.

When streptomycin is tested according to this method at a dose level of ½ mg. per 20-gram mouse administered subcutaneously daily for 21 days, 50% or more of the mice will survive 35 days after infection. When mice are fed para-aminosalicylic acid under the conditions described above, 50% or more will survive 35 days at a dose level of 0.5% concentration in the diet. At a concentration of 0.25% the survival results are variable.

Representative results are summarized in the following table:

ANTITUBERCULAR ACTIVITY

| Compound— Y–⟨⟩–NH–C(S)–NH–⟨⟩–R | | Concentration of drug in feed, percent by weight | Percent animals surviving on 35th day |
|---|---|---|---|
| Y | R | | |
| (CH$_3$)$_2$N– | –OC$_2$H$_5$ | 0.5 / 0.05 / 0.025 | 100 / 100 / 60 |
| (CH$_3$)$_2$N– | –OC$_4$H$_9$ | 0.1 | 100 |
| (CH$_3$)$_2$N– | –OC$_5$H$_{11}$ (iso) | 0.05 / 0.025 | 100 / 90 |
| (C$_2$H$_5$)$_2$N– | –OC$_2$H$_5$ | 0.5 / 0.05 / 0.025 | 100 / 50 / 30 |
| (C$_2$H$_5$)$_2$N– | –OC$_4$H$_9$ | 0.5 | 100 |
| (C$_4$H$_9$)$_2$N– | –OC$_2$H$_5$ | 0.1 | 70 |
| piperidino– | –OC$_2$H$_5$ | 0.05 | 100 |
| (CH$_3$)$_2$N– | –C$_4$H$_9$ | 0.1 | 90 |

That there is a specificity in the activity here involved is indicated by the following table of inactive compounds. For example, such a slight modification as replacing one alkyl R on the amino nitrogen by hydrogen results in loss of activity, while shortening of the R' radical from ethoxy to methoxy likewise results in an inactive compound.

INACTIVE COMPOUNDS

| Compound— Y–⟨⟩–NH–C(S)–NH–⟨⟩–R | | Concentration of drug in feed, percent by weight | Percent animals surviving on 35th day |
|---|---|---|---|
| Y | R | | |
| CH$_3$(H)N– | –OC$_2$H$_5$ | 0.3 | 0 |
| (CH$_3$)$_2$N– | –OCH$_3$ | 0.1 | 0 |
| (CH$_3$)$_2$N– | –Cl | 0.5 | 0 |
| CH$_3$CONH– | –OC$_2$H$_5$ | 0.5 | 0 |
| (CH$_3$)$_2$N– | –N(CH$_3$)$_2$ | 0.1 | 0 |
| H$_2$N– | –NH$_2$ | 0.05 | very toxic |
| C$_6$H$_{13}$– | C$_6$H$_{13}$ | 0.5 | 50 |
| C$_7$H$_{15}$O– | –OC$_7$H$_{15}$ | 0.15 | 0 |

Having thus disclosed the invention what is claimed is:
1-(p-dimethylaminophenyl) - 3 - (p-butoxyphenyl) - 2-thiourea.

References Cited in the file of this patent
UNITED STATES PATENTS

| 1,406,719 | Bedford et al. | Feb. 14, 1922 |
| 1,730,537 | Scott | Oct. 8, 1929 |
| 2,050,557 | Bockmuhl et al. | Aug. 11, 1936 |

FOREIGN PATENTS

| 143,641 | Austria | Nov. 25, 1935 |